United States Patent [19]

Branstner

[11] 4,329,886
[45] May 18, 1982

[54] POSITIVE MESH GEARING SYSTEM FOR TOY CARS

[75] Inventor: Richard L. Branstner, Costa Mesa, Calif.

[73] Assignee: Tyco Industries, Inc., Moorestown, N.J.

[21] Appl. No.: 145,559

[22] Filed: May 1, 1980

[51] Int. Cl.³ .............................................. F16H 1/12
[52] U.S. Cl. ...................................... 74/416; 104/60; 180/75
[58] Field of Search ................ 74/416, 417, 431, 432, 74/423, 424; 180/75; 104/60; 273/86 B

[56] References Cited

U.S. PATENT DOCUMENTS

| | | | |
|---|---|---|---|
| 479,189 | 7/1892 | Kaestner | 74/417 |
| 506,358 | 10/1893 | Branth | 74/424 |
| 726,517 | 4/1903 | Deutsch | 74/424 |
| 1,048,523 | 12/1912 | Giddens | 74/417 |
| 1,106,149 | 8/1914 | Loomis | 74/424 |
| 3,163,123 | 12/1964 | Ziroli | 74/416 |
| 3,378,095 | 4/1968 | Sons | 180/75 |
| 3,837,286 | 9/1974 | Brand et al. | 104/60 |

FOREIGN PATENT DOCUMENTS

| | | | |
|---|---|---|---|
| 594826 | 3/1960 | Canada | 74/423 |
| 597762 | 5/1934 | Fed. Rep. of Germany | 74/417 |

*Primary Examiner*—Lawrence J. Staab
*Attorney, Agent, or Firm*—Seidel, Gonda, Goldhammer & Panitch

[57] ABSTRACT

A system is provided for holding two gears in positive mesh. The gears are used in toy vehicles, wherein the first gear is mounted on a drive shaft and the second gear is mounted on the rear axle of the vehicle. A crown and pinion gear are preferably used. The improvement comprises a pair of spaced elements, such as discs, mounted on the axle and spaced apart to receive between them an extension of the drive shaft. The drive shaft extension lying between the spaced apart elements constrains the rear axle from moving laterally and causing the gears to come out of mesh.

5 Claims, 5 Drawing Figures

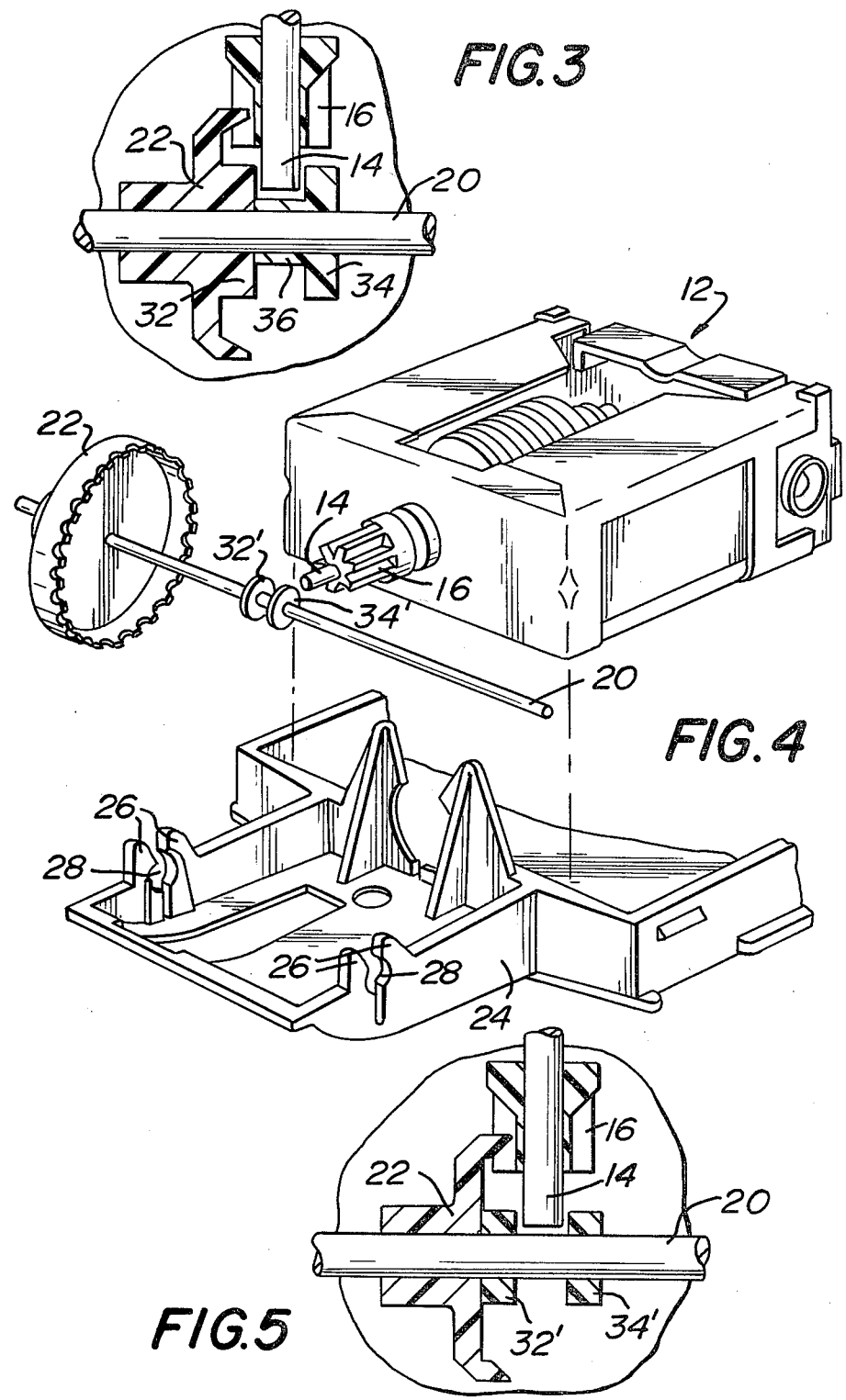

4,329,886

POSITIVE MESH GEARING SYSTEM FOR TOY CARS

BACKGROUND OF THE INVENTION

This invention relates to an improved system for maintaining a positive mesh between certain gears of a type used to translate power from a motor to a wheeled axle.

In the field of toy miniature powered vehicles, it is common to have the motor drive a rigid rear axle through direct gearing. Since the motor is usually located forward of the axle, the motor drive shaft is oriented perpendicular to the axle, so that the gearing must shift the plane of rotation 90°. The gearing usually has a substantial reduction ratio to keep the vehicle speed reasonable given a relatively high motor RPM.

A commonly employed gear system fitting the above requirements comprises a pinion gear on the drive shaft, meshed to a relatively large diameter crown gear on the axle. This combination is simple and inexpensive, both important considerations in view of the low cost nature of the vehicle product, and yet it quite adequately meets the requirements demanded of a gear train for toy vehicles.

A major problem with this gear system lies in maintaining a positive mesh of the crown gear teeth with the pinion gear despite lateral movement of the rear axle. One solution has been to provide a sleeve or spacer on the axle between the frame of the chassis and the crown gear. The sleeve may actually be an integral extension of the crown gear itself. Other possible solutions include collars on the axle on either side of the frame, or a sleeve between the frame and a wheel of the rear axle. However, there are shortcomings in the systems described above. Large contact areas between the sleeves and frame or wheel cause increased frictional drag. They are also susceptible to binding if the frame or axle is slightly bent or if a piece of debris should get wedged between the surfaces. If the frame or axle is significantly bent, the gears may come out of mesh.

The present invention is directed to an improved method of maintaining a positive gear mesh between the motor pinion and axle crown gears.

SUMMARY OF THE INVENTION

In a gear system connecting the drive shaft of a motor with a wheeled rear axle, wherein the teeth of the respective gears must be held in positive mesh, the improvement comprising extending the drive shaft toward the rear axle and seating the extended shaft in sliding contact with and between two discs fixed in spaced relation on the axle. The gear system may normally comprise a pinion gear mounted on the motor drive shaft and a crown gear mounted in fixed position on the axle. The drive shaft extends beyond the pinion gear between the discs fixed on the axle. Both the drive shaft extension and the discs are preferably constructed of a low friction polymer material. The discs may be mounted as an integral unit on the axle or, alternatively, one of the discs may be an integral portion of the crown gear. Preferably, the drive shaft extension is a stub which extends between the top portion of the discs, above the axle, as the vehicle is viewed in its upright position so that the stub does not contact the axle itself.

BRIEF DESCRIPTION OF THE DRAWINGS

FIG. 3 is a top section view of the improved positive mesh gear system shown in FIG. 1.

FIG. 4 is an exploded view of another embodiment of the invention.

FIG. 5 is a top section view of the improved positive mesh gear system shown in FIG. 4.

Figure 1:
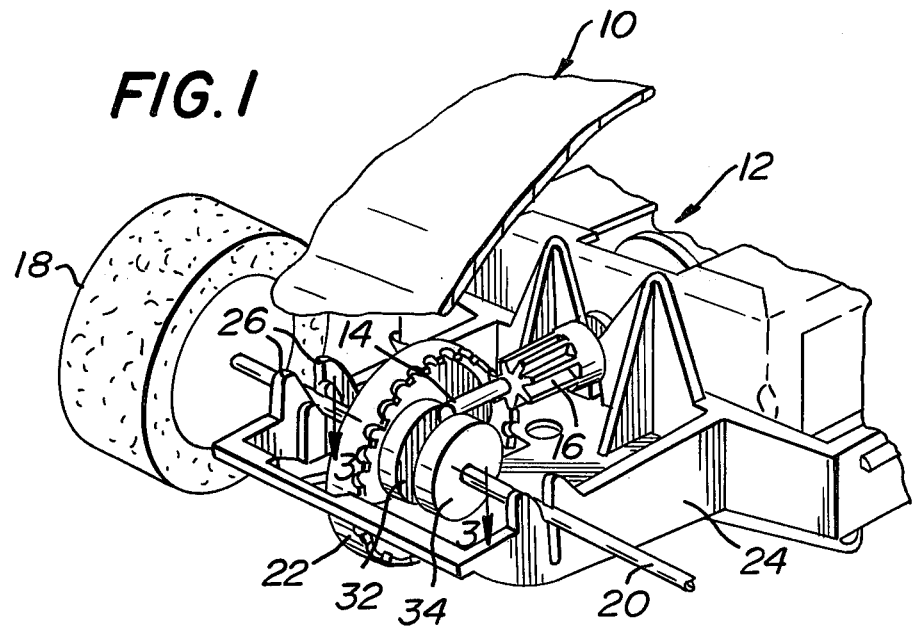
FIG. 1 is a perspective view of the rear portion of a miniature vehicle having substantially all of the chassis cut away to reveal the relevant drive elements.

For the purpose of illustrating the invention, there is shown in the drawings a form which is presently preferred; it being understood, however, that this invention is not limited to the precise arrangements and instrumentalities shown.

DETAILED DESCRIPTION

Referring now to the drawings wherein like numerals indicated like elements there is shown in FIG. 1 the rear end of a toy vehicle designated generally as 10. Vehicle 10 is a powered vehicle of the type commonly found in toy racing games. Power is provided through motor 12 which is depicted herein as a simple direct current electrical motor.

Motor 12 is located approximately in the mid section of vehicle 10, and in fact is normally the major component in vehicles of this type, occupying the greatest space and constituting a large portion of the weight of the vehicle. Motor 12 provides power for the rotation of a drive shaft 14. Mounted on drive shaft 14 is a pinion gear 16.

The rear wheels 18 of the toy vehicle are mounted on a straight rigid rear axle 20. Mounted on axle 20 is crown gear 22 which engages the teeth of pinion gear 16 to translate the motive power from the drive shaft 14 to the rear axle 20.

Figure 2:
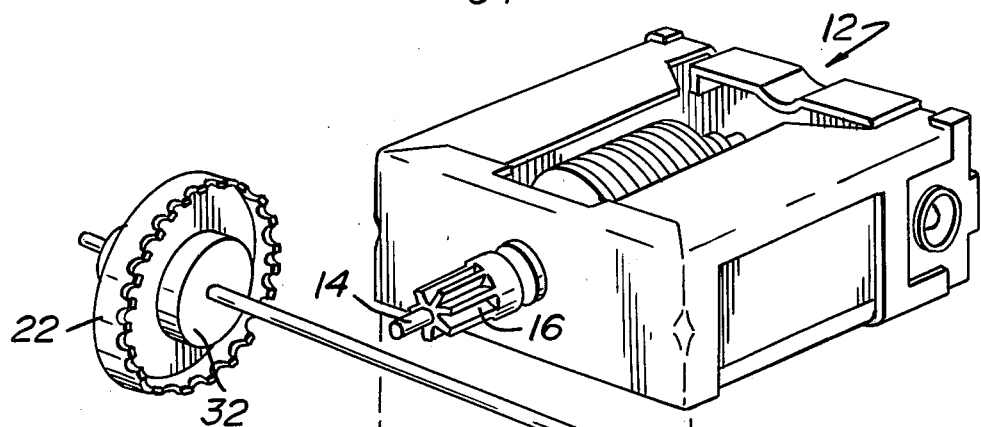
FIG. 2 is an exploded view of FIG. 1 wherein the major components are slightly separated from their assembled position.
Figure 2:
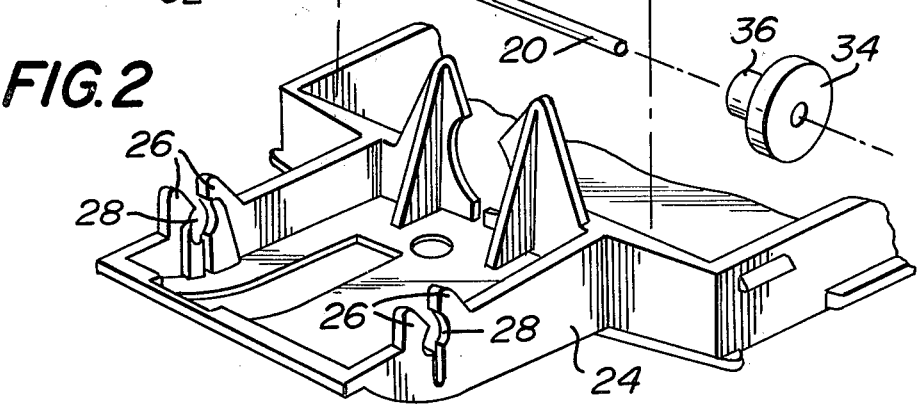

Referring now to FIG. 2, the rear axle 20 is journaled to the frame 24 of the toy vehicle through resilient flanges 26 which define a circular channel 28 open at the top.

To constrain lateral displacement of the rear axle so that the teeth of pinion gear 16 and crown gear 22 are maintained in mesh, there are provided two discs 32 and 34. Discs 32 and 34 are rigidly fixed to axle 20 and are spaced apart a distance approximately equal to or slightly greater than the outside diameter of drive shaft 14.

In the embodiment shown in FIGS. 1 and 2, disc 32 is an integral extension of crown gear 22. Additionally, disc 34 has a relatively small diameter sleeve 36 of a length corresponding to the outside diameter of drive shaft 14, so that in assembly crown gear 22 and disc 34 may simply be pushed onto axle 20 until disc 32 contacts sleeve 36.

It will be noted that drive shaft 14 extends sufficiently beyond pinion gear 16 to pass between and in contact with at least one of discs 32 and 34. This interaction between shaft 14 and discs 32 and 34 holds axle 20, which might otherwise slide from left to right, in a relatively fixed position and thus insures that crown gear 22 remains in mesh with pinion gear 16.

Preferably, drive shaft 14 is raised above the level of axle 20 so that it fits between discs 32 and 34 near the top of the discs. This keeps the surface contact areas between the drive shaft 14 and other elements at a minimum. At this elevation, the drive shaft is also less susceptible to having debris forced between the moving surfaces. It is preferred that the drive shaft 14 lie approximately on the longitudinal center line of the vehicle and thus intersect the rear axle 20 at approximately the midpoint of the axle.

FIG. 3 shows clearly the cooperation of discs 34 and 32 with drive shaft 14 in holding axle 20 in position, thus insuring that the crown 22 and the pinion gear 16 remain in mesh.

An alternative embodiment is shown in FIG. 4. There discs 32' and 34' are separate discs which are friction fit on rear axle 20 at spaced locations to accomodate the drive shaft 14 as previously described. It would also be possible for discs 32' and 34' to be spaced integral flanges of axle 20 itself, or the end flanges of a spool shaped element which is friction fit onto axle 20. In any case, drive shaft 14 extends sufficiently towards the axle 20 to fit between discs 32' and 34' as before. Crown gear 22 is positioned on axle 20 to mesh with pinion gear 16 and is affixed to axle 20 by any suitable means such as by friction fit.

FIG. 5 illustrates the cooperation of discs 32' and 34' with drive shaft 14 in holding axle 20 in a relatively fixed position, thus insuring that crown gear 22 remains in mesh with pinion gear 16. It is currently preferred that axle 20 be constructed of a ferrous material, and that crown gear 22, pinion gear 16, and discs 32' and 34 be of a low friction polymer material. Drive shaft 14 may extend beyond the pinion gear 16 or the drive shaft 14 could terminate within pinion gear 16 and the pinion gear could be provided with an integral extension or stub which extends between discs 32 and 34. This latter method is presently preferred.

The present invention may be embodied in other specific forms without departing from the spirit or essential attributes thereof and, accordingly, reference should be made to the appended claims, rather than to the foregoing specification, as indicating the scope of the invention.

I claim:

1. In a gear system for use in a toy vehicle, wherein a first drive gear is mounted on a drive shaft which transmits motive power to a driven wheeled axle and wherein a second driven gear is mounted on the wheeled axle, the wheeled axle being subject to lateral displacement with respect to the drive shaft, the drive shaft being substantially perpendicular to the axle, and the first and second gears being in mesh to couple power from the drive shaft to the driven wheeled axle, the improvement comprising drive shaft extension means coupled to said first drive gear, said drive shaft extension means extending in a direction substantially perpendicular to the driven wheeled axle, and constraint means including at least two elements mounted on the driven wheeled axle and spaced apart to receive between them said drive shaft extension means whereby lateral displacement of the driven wheeled axle with respect to the drive shaft is constrained in two directions by contact between either of said elements and the drive shaft extension means.

2. The improvement according to claim 1 wherein said constraint means includes a disc secured to the wheeled axle and a sleeve mounted on the axle between said disc and second gear for spacing the disc a fixed distance from the second gear.

3. The improvement according to claim 1, wherein said constraint means includes at least one element which is integral with said second gear.

4. The improvement according to claim 1, wherein the extension means is an integral part of the first gear.

5. In a gear system as in claims 1, 2, 3 or 4, wherein the first gear is a pinion gear and the second gear is a crown gear.

* * * * *